United States Patent [19]
Omann

[11] Patent Number: 5,664,348
[45] Date of Patent: Sep. 9, 1997

[54] ROCK AND MATERIAL LOADING APPARATUS

[76] Inventor: Lawrence F. Omann, 39947 95th Ave., St. Joseph, Minn. 56374

[21] Appl. No.: 702,147

[22] Filed: Aug. 23, 1996

[51] Int. Cl.$^6$ .............................. A01A 15/02; E02F 3/28
[52] U.S. Cl. .................. 37/405; 37/903; 414/724; 171/132
[58] Field of Search ...................... 37/405, 408, 409, 37/410, 903; 171/63, 86, 105, 106, 107; 414/716, 722, 723, 724, 725, 726

[56] References Cited

U.S. PATENT DOCUMENTS

| | | | |
|---|---|---|---|
| D. 361,772 | 8/1995 | Hulsey . | |
| 2,491,079 | 12/1949 | Bestland . | |
| 2,597,374 | 5/1952 | Richey | 414/724 |
| 2,617,210 | 11/1952 | Thebiay . | |
| 2,635,884 | 4/1953 | Christiansen | 275/1 |
| 3,003,265 | 10/1961 | Lutjens | 414/726 X |
| 3,082,828 | 3/1963 | Schindelka . | |
| 3,100,540 | 8/1963 | Deaver et al. . | |
| 3,307,277 | 3/1967 | Kondracki | 414/724 X |
| 3,557,877 | 1/1971 | Hoffman . | |
| 3,596,764 | 8/1971 | Smith . | |
| 3,643,821 | 2/1972 | Viel . | |
| 3,765,490 | 10/1973 | Logue | 171/132 |
| 4,303,507 | 12/1981 | Smith . | |
| 4,411,585 | 10/1983 | Quinn . | |
| 4,729,180 | 3/1988 | Hendricks . | |
| 4,790,717 | 12/1988 | Anderson | 414/722 |
| 5,027,906 | 7/1991 | Jeannotte et al. | 37/903 X |
| 5,241,764 | 9/1993 | Modig | 37/405 |
| 5,564,885 | 10/1996 | Staber, Jr. | 414/724 |

*Primary Examiner*—Terry Lee Melius
*Assistant Examiner*—Robert Pezzuto
*Attorney, Agent, or Firm*—Albert W. Watkins

[57] ABSTRACT

A rock picker and material loader attachment is pivotally mounted to a loader scoop or bucket and extends longitudinally forward therefrom. A plurality of teeth form the leading surface of the attachment during digging and loading operations. Also adjacent the bucket and support bar is a laterally extending debris catcher. During picking and scraping operations, the debris catcher is perpendicular to the bottom of the bucket, extending up from the bottom and thereby acting as a block or retaining plate which assists in retaining debris in the bucket. Two longitudinal knees form a quarter-circle are at or near the longitudinal position of the mounting between the attachment and the bucket. During loading from the inventive attachment to the bucket, the knees are used to pivot the attachment and allow material or debris to roll into the bucket. While the attachment is pivoting, the debris catcher assists by moving any debris near the edge of the bucket back and away therefrom. The attachment is useful for rocks, manure, trash, bales and other materials. A variety of alternative component designs are disclosed, including a different tooth configuration more suitable for loading pallets, logs and the like and different styles of bucket to fit the type of material. Hydraulics are also disclosed to actuate the attachment as an alternative, further extending the versatility of the invention.

19 Claims, 7 Drawing Sheets

ROCK AND MATERIAL LOADING APPARATUS

BACKGROUND OF THE INVENTION

1. Field of the Invention

This invention pertains to excavating, earth working and material handling equipment generally, and specifically to loader scoop or bucket attachments that are designed for efficient rock picking or for material loading, and transport of either.

2. Description of the Related Art

Many industries use front-end loaders and tractors, which are highly versatile machines. Generally configured with a front end bucket, these machines are capable of transporting many thousands of pounds of materials. Most loaders are capable of maneuvering about in relatively small spaces, further adding to their versatility. The bucket is useful for scooping from large piles or smooth surfaces, and so may be used not only for moving materials about but also for cleaning up surfaces.

However, a standard bucket has a lateral leading edge which is difficult to use for irregular materials such as logs or pallets. Further limiting a front-end loader is the relative difficulty of using the bucket for digging into dense or packed materials such as the earth, or scraping the irregular ground. Recognizing these limitations of a scoop or bucket, and yet also understanding the vast potential for these compact and powerful machines, previous inventors have designed alternative attachments for front-end loaders. Among the inventions are those illustrated in U.S. Pat. No. 3,557,877 to Hoffman, U.S. Pat. No. 3,643,821 to Viel, and U.S. Pat No. 4,303,507 to Smith, the teachings of each incorporated herein by reference.

Hoffman discloses an attachment, referred to as a picker head, for a tractor or the like. The picker head, which replaces the standard bucket, consists of a plurality of longitudinal, parallel teeth. The teeth are spaced from each other, which improves penetration of the earth and also ensures that any dirt which is gathered with rock will drop back to the earth and not be retained in the picker head. The picker head may also be used to scrape along the irregular earth surface to sift rocks from any loose top soil.

Viel discloses an attachment similar to Hoffman, and, like Hoffman, discloses the rock picker as a replacement for the bucket. Like Hoffman, the Viel design discloses a plurality of longitudinal, parallel teeth for picking rocks. In the Viel design, the tractor hydraulics are used to move and orient the rock picker attachment. Neither Hoffman or Viel provide a way to pick rocks or other debris, load, and then continue to pick. Rather, in the Hoffman and Viel designs, the picker attachment is used as a replacement for the loader bucket. Where a large number of rocks or several very large rocks or other debris need loaded, the lack of loader bucket is a distinct disadvantage.

Several additional disadvantages exist in the Viel and Hoffman designs. The use of the picker head as the debris carrying structure limits the operator to only one type of debris in a load. For example, brush or fallen logs and rocks may both need to be removed from a location. The brush will normally be unloaded in one place, such as for burning, composting, etc., while rocks will normally be deposited elsewhere.

Furthermore, the picker head is designed for picking, not for holding material. The picker head is flat, with no side walls. A loader bucket has deep side walls designed for retaining material in the bucket. When hauling rock or other debris, very little may be carried directly on the picker head without dropping therefrom. Being able to transfer the material to some other container such as the loader bucket for transport would be a distinct advantage.

Another disadvantage of the Hoffman and Viel designs occurs during unloading. Directly controlling the attachment with hydraulics or cables limits how fast the attachment may be moved. Some materials are more difficult to remove, and so may not be adequately unloaded by the Hoffman and Viel designs.

Smith discloses a scraper sifter which hangs from a bucket by chains. The chains provide a lost-motion connection, allowing the bucket to float over surface irregularities in the ground. However, due also to the chain connection, the Smith invention is unable to be used for digging.

Other attachments and free-standing rock pickers are illustrated in U.S. Pat. Nos. 2,491,079, 2,617,210, 3,082,828, 3,100,540, 3,596,764, 4,411,585, 4,729,180, and D361,772, the teachings of each incorporated herein by reference.

SUMMARY OF THE INVENTION

A rock picker and material loader attachment is pivotally mounted to a loader scoop or bucket and extends longitudinally forward therefrom. A plurality of tooth receivers and tooth receiver supports are supported by a lateral support bar at an end adjacent the bucket. The tooth receivers receive and support removable teeth which extend longitudinally to a point distal of the bucket. The teeth form the leading surface of the attachment for digging and loading operations. Also adjacent the bucket and support bar is a laterally extending debris catcher. The debris catcher is oriented with the plane of the major surface perpendicular to the plane of the major surface of the support bar. During loading, the plane of the major surface of the support bar is parallel to the bottom surface of the bucket. The debris catcher is perpendicular to the bottom of the bucket, extending up from the bottom and thereby acting as a block or retaining plate which assists in retaining debris in the bucket. Two longitudinal knees form a quarter-circle arc at or near the longitudinal position of the mounting between the attachment and the bucket. During loading from the inventive attachment to the bucket, the knees are used to pivot the attachment and allow material or debris to roll into the bucket. While the attachment is pivoting, the debris catcher assists by moving any debris near the edge of the bucket back and away therefrom.

OBJECTS OF THE INVENTION

A first object of the present invention is to allow continuous rock digging and loading, until the capacity of the loader bucket is reached. A further object of the invention is to allow easy and quick modification of existing equipment to accommodate the attachment and thereby make the equipment more versatile. Another object of the invention is to ensure easy maintenance of the attachment.

Yet another object of the invention is to allow a loader to load as many diverse materials as possible, including rock, manure, logs and trees, hay bales and other baled material, trash, and others. A further object of the invention is to allow a standard attachment to fit a variety of loaders and tractors. An additional object is to enable rapid motion in the attachment during unloading. These and other objects are achieved by the preferred embodiment of the invention, as described hereinbelow.

DESCRIPTION OF THE PREFERRED EMBODIMENT

Figure 1:
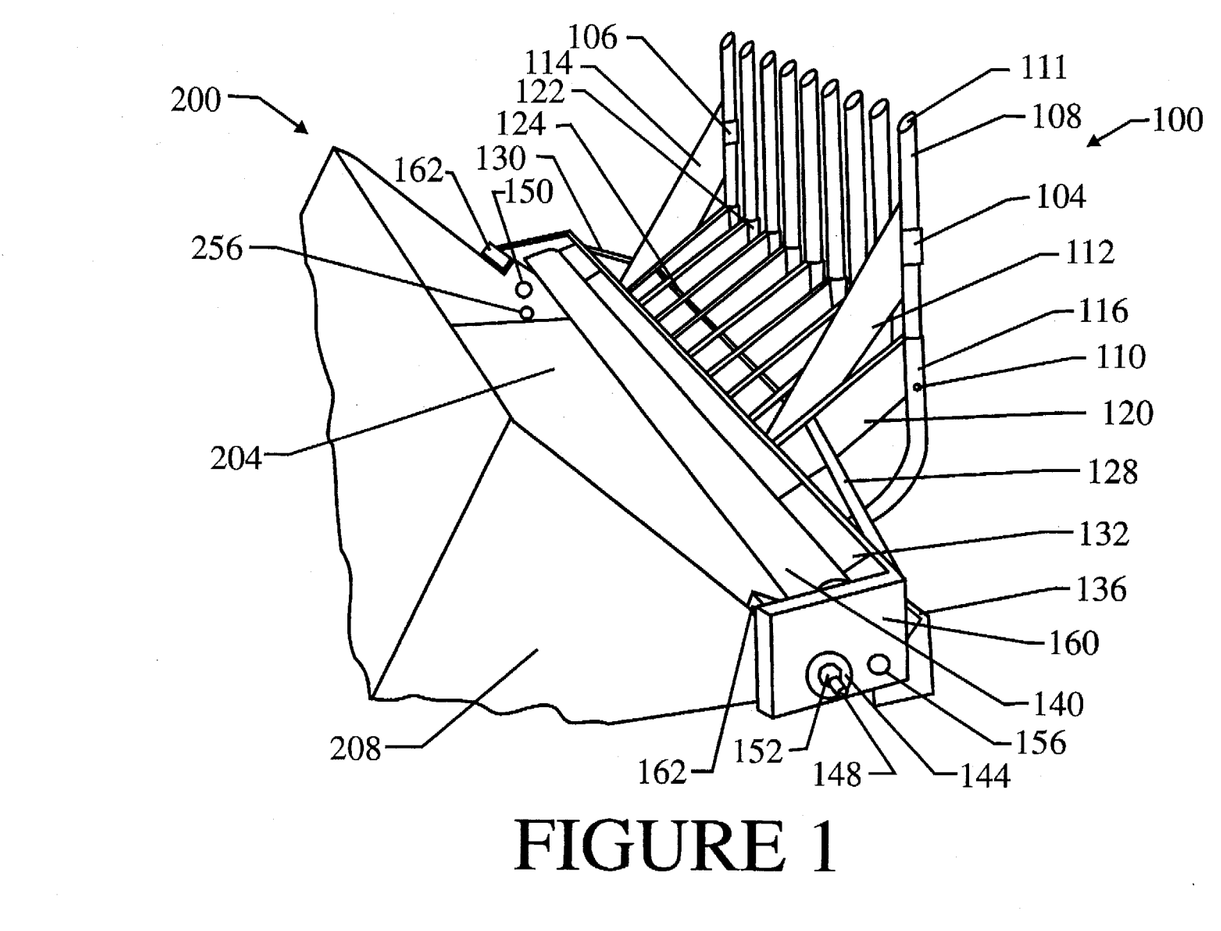
FIG. 1 illustrates a loader attachment designed in accord with the invention from a projected view, with the attachment in a bucket loading position.

FIG. 1 illustrates an embodiment of the invention from a projected view. Therein, rock and material loader attachment 100 is shown with a plurality of teeth 108 extending in a vertical direction. When each moth 108 is vertical as shown in FIG. 1, this is bucket 200 loading position. Rocks or other material previously loaded onto teeth 108 will roll from teeth 108 across tooth holder supports 120 and into bucket 200 when attachment 100 is in this position. The material will be dropped onto bottom 204 of bucket 200, and retained therein by bucket sides 208 and debris catcher 140.

Each tooth 108 is preferably made from high tensile strength steel or other material suitable for enduring significant loads and forces. Teeth 108 are parallel and spaced from each other. Each tooth 108 is attached to a tooth holder 122, and may be retained therein, for example by an easily removable pin 110. Each tooth holder 122 attaches to a moth holder support 120, which may, for example be formed from plate steel. Tooth holder supports 120 are anchored to support bar 160 at an, end adjacent to bucket 200.

Support bar 160 will be made from a strong material, such as heavy steel, capable of distributing the force from each tooth 108 into bucket 200 without destruction. Support bar 160 attaches to bucket 200 through bolts 148 and 150, washer 144, and nut 152. Nut 152 may be pinned, or may be of special type such as the nylon self-locking type, to allow support bar 160 to be securely attached to bucket 200 while still being free to allow rotation thereabout. Other fasteners and bearing type structures are known to accomplish this function and will be considered to be incorporated herein. As shown in FIG. 1, support bar 160 is prevented from further counter-clockwise rotation about bucket 200 by stops 162 attached to support bar 160. Stops 162, in this position, are engaging sides 208 of bucket 200.

Additional support for each of the tooth holder supports 120 is provided by stabilizer bars 124, 128 and 130. Left plate 114 and right plate 112 serve, in combination with teeth 108 and tooth holder supports 120, to form a bucket within which rock and other material may be retained. In other words, without left and right plates 112 and 114, rocks being collected may simply fall off attachment 100 prior to being loaded into bucket 200. Since each tooth 108 is replaceable, left and right plates 112 and 114 are held to each respective tooth 108 by small cuffs 104 and 106. These cuffs have an inner diameter just slightly larger than tooth 108, so as to allow tooth 108 to pass therethrough.

Debris catcher 140 is spaced from support bar 160 by spacers 132. While bucket 200 is being loaded, as shown in FIG. 1, debris catcher 140 is rotated so as to keep material being loaded into bucket 200 away from the open edge of bucket 200 closest attachment 100. Debris catcher 140 may be manufactured as an integral part of support bar 160, when desirable.

Two knees 116 and 118 (visible in FIG. 3) form a quarter-circle arc through which attachment 100 may be rotated relative to bucket 200. Rotation occurs, as aforementioned, about bolts 148 and 150. Knees 116 and 118 may be formed from pipe and bent to appropriate shape. By so forming, knees 116 and 118 also act as tooth holders without requiring a separate tooth holder 122. While only two knees are illustrated, a designer may opt for one or more such knees, depending upon the requirements of the particular design. Each tooth holder 122 could be replaced by knees similar to right and left knees 116 and 118. The use of knees to replace all tooth holders 122 will structurally enhance attachment 100, and also improve the ability of attachment 100 to be flipped on softer surfaces. Furthermore, other devices or structure could be used which would approximate the function of the knees. Such devices might include rollers, wheels or other structure which will cause the teeth to rotate upwards towards bucket 200. Even the use of a ground engaging point or simple corner in place of knee 116 could be used to actuate rotation, by dropping bucket 200 while dragging bucket 200 backwards.

Figure 2:
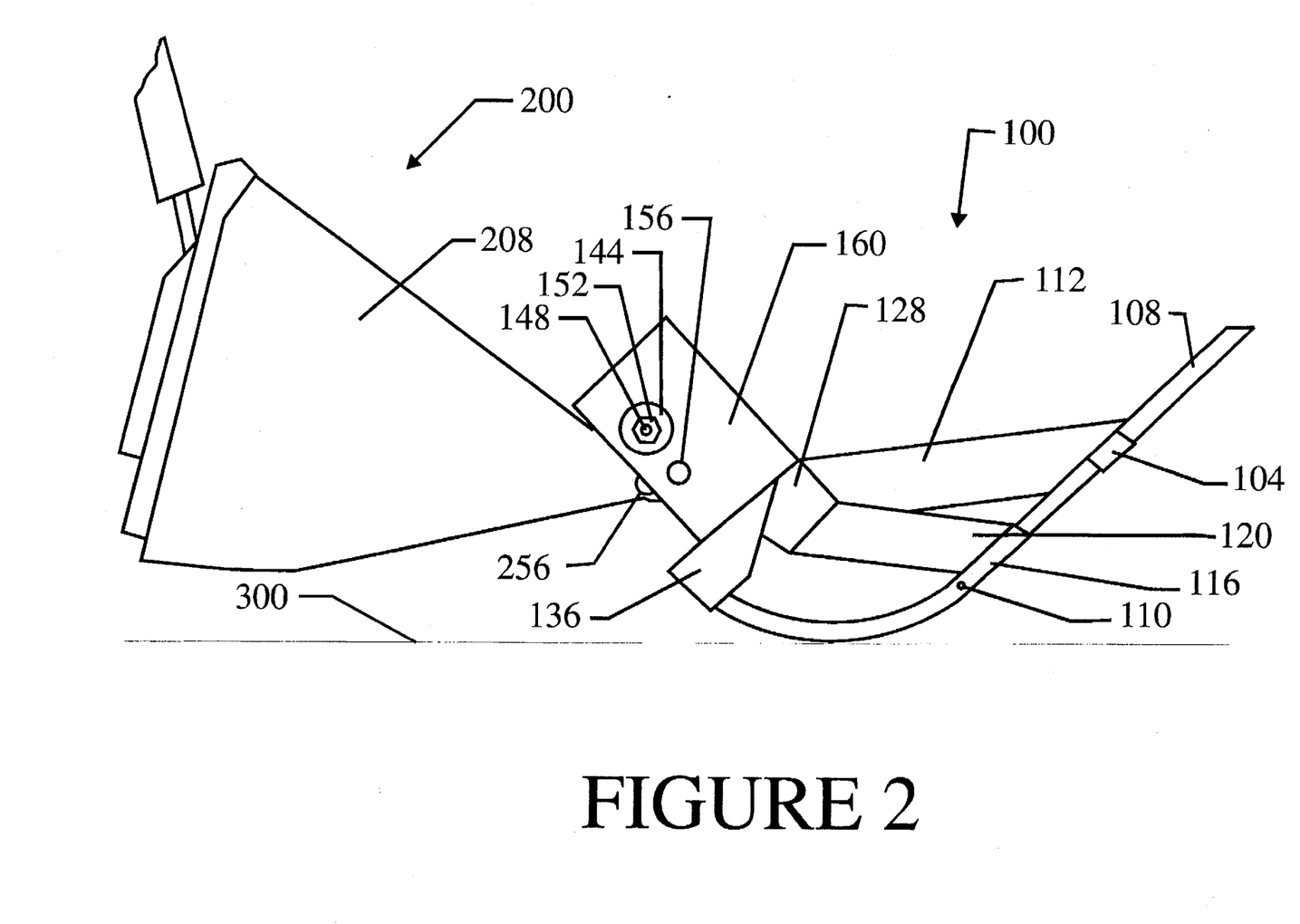
FIG. 2 illustrates the loader attachment of FIG. 1 from a side view in a position between bucket loading and attachment loading.

FIG. 2 shows loader attachment 100 halfway between surface scraping and loading of bucket 200, from a side view. For consistency throughout this disclosure, all elements which are the same will be numbered the same, regardless of the figure in which they appear. Also for the purposes of this disclosure, when an object is referred to as being forward or moved forward, this will be understood to be in a direction approximately parallel to a line drawn from bucket 200 towards teeth 108 in this FIG. 2, with teeth 108 being more forward than bucket 200. A movement or direction referred to as backward will be oppositely oriented.

From this view in FIG. 2, the right knee 116 is visible, showing the rotation of attachment 100 about bolts 148 and 150, the rotation which is controlled by contact between right and left knees 116 and 118 and the earth surface 300. If bucket 200 is raised, attachment 100 will be rotated to the scraping position, where teeth 108 are scraping along the surface of ground 300 (illustrated in FIGS. 6 and 7). If bucket 200 is lowered, attachment 100 will be rotated to the bucket 200 loading position illustrated in FIG. 1. If bucket 200 is lowered quickly, teeth 108 will be raised to the position shown in FIG. 1 quickly, followed by a sudden stop of rotation when stops 162 engage bucket sides 208. Any material or debris carried on teeth 108 will literally be tossed by this motion into bucket 200. Stops 162 are most ideally positioned so that when bucket 200 is raised from the position shown in FIG. 1, attachment 100 will rotate clockwise under the force of gravity alone, without further assistance.

While knees 116 and 118 are illustrated, one of skill in the art could also use hydraulic cylinders mounted with bucket 200 to rotate attachment 100. The disadvantage however, as with loader bucket replacements of the prior art, is an increased difficulty shaking attachment 100 for unloading.

Figure 3:
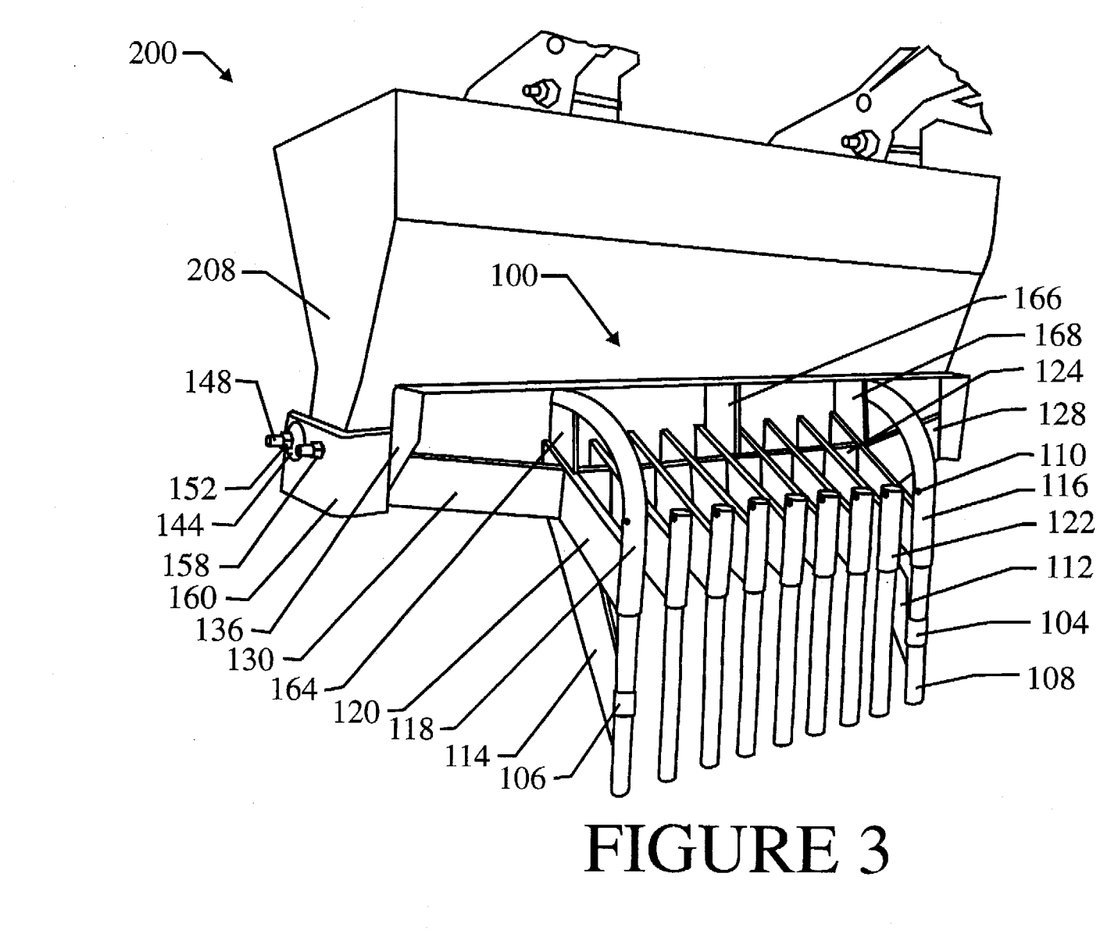
FIG. 3 illustrates the loader attachment of FIG. 1 pinned for manure loading, from a back view in a dumping position.

FIG. 3 illustrates attachment 100 and bucket 200 from an underneath or behind projected view, in a bucket 200 unloading position by projected view. The view from FIG. 3 is nearly what the operator sees during bucket 200 unloading, as the bucket 200 will be forward of the operator and attachment 100 will be hanging down therefrom in FIG. 3, rotation prevention pin 158 is shown inserted into rotation locking hole 156 and through bucket rotation locking hole 256, which prevents rotation between attachment 100 and bucket 200. Pin 158 is preferred when loading manure and other similar materials. While not necessary for operation, pin 158 allows for more positive shaking of attachment 100 by bucket 200, thereby ensuring better unloading of tenacious material such as manure from teeth 108 and tooth supports 120.

Also most visible from FIG. 3 is knee support 136, left knee longitudinal brace 164, central longitudinal brace 166 and right knee longitudinal brace 168. From this bottom side view of FIG. 3, a number of less-apparent features of the preferred embodiment, which forms one implementation of the invention, are identifiable. Specifically, the end of left knee 118 adjacent to knee support 136 is visible. While attachment 100 is in the position illustrated in FIG. 3, forces applied to left knee 118 and right knee 116 are distributed along bucket 200 farther from the leading edge. In this way, knees 116 and 118 add structural support, enhancing the overall strength of attachment 100. The use of knees to replace tooth holders 122 can further enhance strength.

Another advantage gained by using knees 116 and 118 is in pivoting of attachment 100 relative to bucket 200. When attachment 100 is extending longitudinally from bucket 200, as it is in this FIG. 3, left and right knees 118 and 116 arc to a point behind the pivot bolts 148 and 150. In fact, in the scraping position, shown for example in FIG. 6, knees 116 and 118 begin their arc beneath and only slightly in front of pivot bolts 148 and 150. One of ordinary skill will recognize that the relative location of the arc to the pivot point may be changed by a variety of means including adjustment screws and/or slotted plates at the connection between attachment 100 and bucket 200. Additionally, the attachment 100 may be designed with different relative positions between the axis of pivot and the start and end of arc of knees 116 and 118. Different geometries may be chosen for the arc of knees 116 and 118. All variations are considered to be within the spirit of the invention.

Design and/or adjustment of these relative positions affects how quickly attachment 100 may be flipped between loading and unloading positions, and how much force is applied to different portions of attachment 100 and bucket 200 during flipping. Such variations are deemed to be within the spirit of the invention. For example, in the illustrated embodiment as shown in FIG. 2, a downward force from bucket 200, which may either be purely gravitational or with hydraulic assistance, will flip attachment 100 to the position illustrated in FIG. 1. From FIG. 2, the point of ground contact is near but in front of the leading edge of the bucket. If the point of ground contact is too far back, underneath the leading edge of bucket 200, then a downward force would fail to flip the bucket and a rearward motion of the machine implement carrying bucket 200 is necessary. If the point of ground contact is too far forward of the leading edge of bucket 200, then a very large downward motion may be required to flip bucket 200 to the bucket 200 loading position shown in FIG. 1. Depending upon the other dimensions of attachment 100, it is possible that some materials will not be adequately rolled or propelled into bucket 200 if the point of ground contact is too far forward. The preferred positioning illustrated allows boulders to be tossed into bucket 200 by quickly lowering bucket 200 towards the ground.

Figure 6:
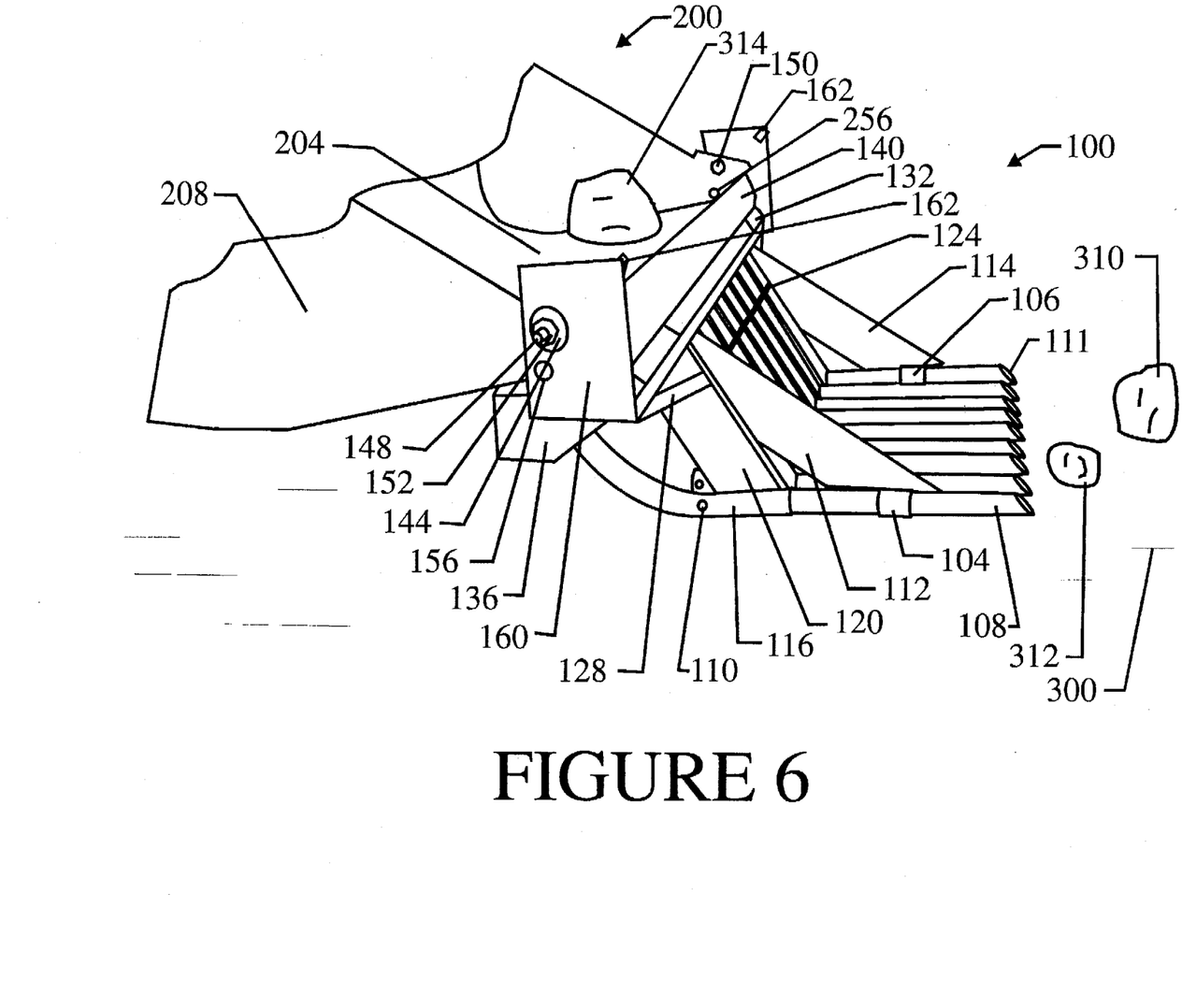
FIG. 6 illustrates the loader attachment of FIG. 1 by projected view in scraping position for picking loose surface material.

Also perhaps most visible in FIG. 3 is the fact that teeth 108 do not extend the full width of bucket 200. The width of teeth 108 relative to bucket 200 is a choice which will be made by the designer. In the preferred embodiment, teeth 108 do not extend full width to enable better digging into the earth or other dense material. Also, as will be explained in reference to FIG. 7, sturdy knee supports may be used for special functions such as pallet loading. However, when attachment 100 is preferred to be used primarily for ground scraping such as shown in FIG. 6, teeth 108 might be more preferably extended to the full width of bucket 200 by the addition of several more teeth 108, tooth holders 122 and tooth holder supports 120. Due to the extra structural strength afforded by replacing tooth holders 122 with knees, lighter materials may also be used for such knees.

Figure 4:
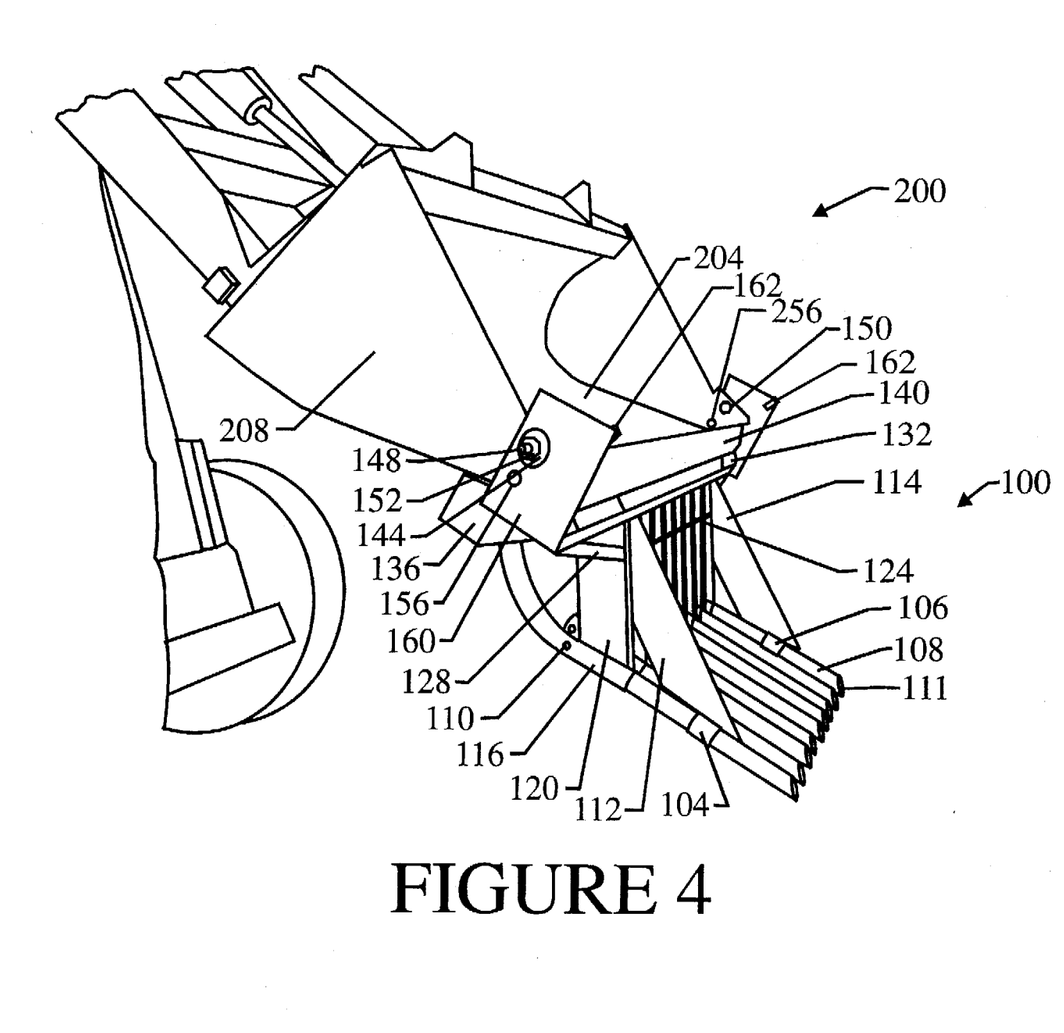
FIG. 4 illustrates the loader attachment of FIG. 1 by projected view in digging position as might be used for digging large rocks from the earth.

FIG. 4 illustrates attachment 100 and bucket 200 in a rock digging position. Each tooth 108 is positioned for a downward and forward angle of penetration into the earth. An operator will move the bucket 200 forward while simultaneously slowly lowering. When teeth 108 engage the earth, they will be driven into the ground by forward motion of bucket 200. As can be seen in FIG. 4, in the digging position, the leading edge 111 of tooth 108 is tapered so as to assist in driving each tooth 108 into the ground or underneath other material. From this position, rocks may be dug which are as large as bucket 200 may hold.

Debris catcher 140 prevents any rock or other material previously loaded from dropping back out of bucket 200 during digging. Therefore, attachment 100 may be used repetitively to dig rocks or other material and load the same into bucket 200, without an operator having to stop to unload bucket 200. In the case of rock picking, this subtle advantage can be very important since there may be a great distance between the rocks being loaded and the dumping place where the rocks are being moved to. In addition, diverse materials may be simultaneously loaded, one type carried in bucket 200 and another type on attachment 100. Both materials may be carried simultaneously and separately.

Figure 5:
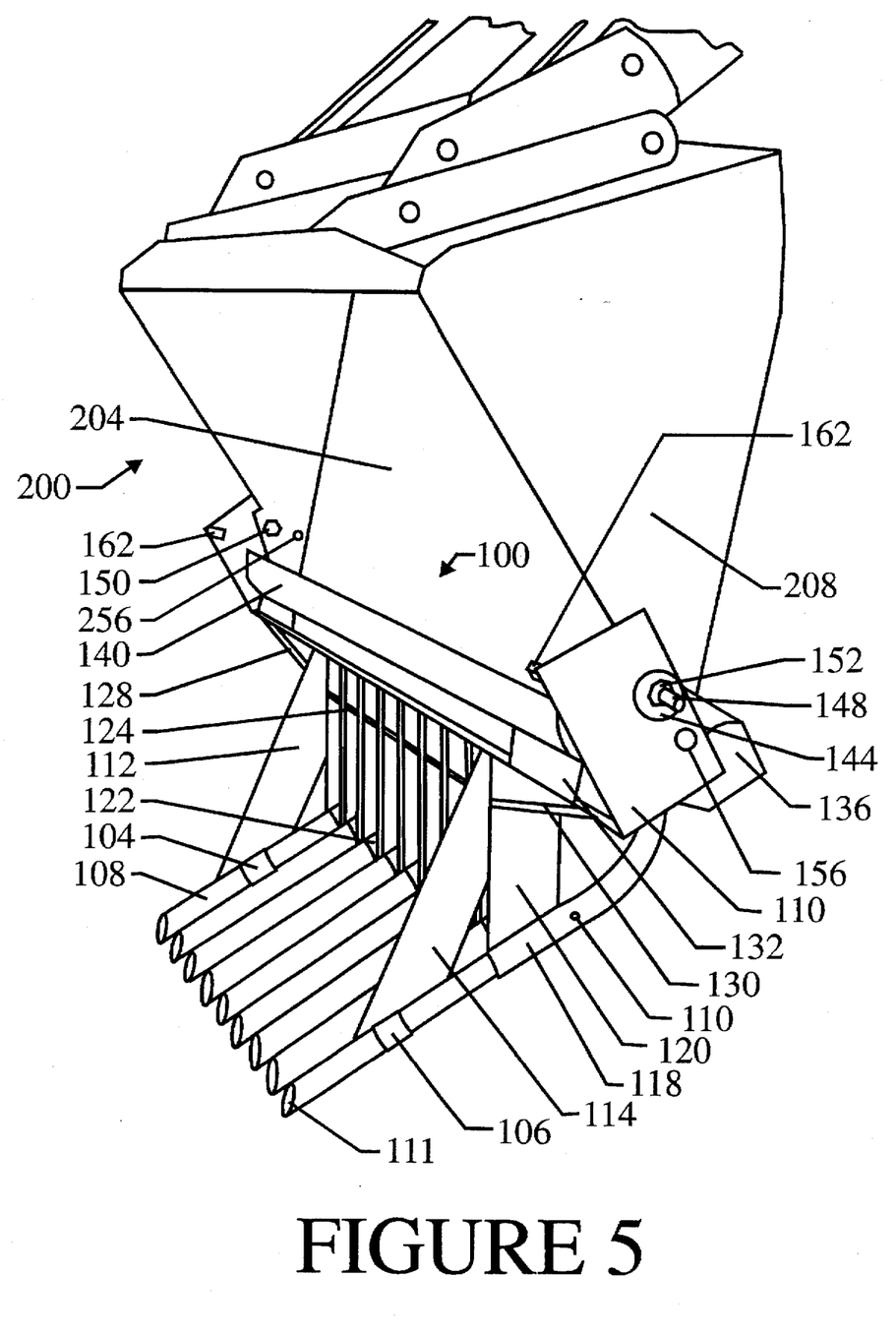
FIG. 5 illustrates the loader attachment of FIG. 1 by projected view in dumping position.

FIG. 5 illustrates attachment 100 and bucket 200 in bucket 200 dumping position. While not immediately apparent in the still figure, the leading edge of bucket 200, and consequently attachment 100, will be swung forward and backwards. Any material within bucket 200 will be shaken out as debris catcher 140 is variously rotated relative to bucket bottom 204. Material will be pushed upwards when debris catcher 140 is rotated closer to the bottom 204, brought about by the leading edge of bucket 200 being moved backward. As the leading edge of bucket 200 is then swung forward, pushing the material forward, debris catch 140 is opened away from bucket 200 allowing the material to be thrown out by the forward motion.

FIG. 6 illustrates rock and material loader attachment 100 actually picking rocks. Teeth 108 are sliding along the surface of earth 300, and will slide under rocks 310 and 312, lifting them onto teeth 108 and backwards closer to bucket 200. Within bucket 200 is rock 314, which was picked and loaded earlier. Teeth 108 will follow the irregular surface of the ground to some extent, since some limited rotation is available for teeth 108 to be lifted off of the earth. However, knee support 136, which extends underneath bucket 200, prevents further movement of teeth 108 downward into earth 300. Therefore, by proper orientation of bucket 200, an operator can ensure that attachment 100 is not allowed to dig deeply into the surface of earth 300, unless so intended. Additional adjustment may be provided by bolts, shims, wedges or other such means, to ensure that when bucket 200 is appropriately positioned, attachment 100 is level with the surface of earth 300. Stops 162 limit rotation in the opposite direction, during bucket loading, as aforementioned. Other stops may be devised for attachment 100, to limit rotation in either direction, and the incorporation of such stops is understood to be a part of the present invention.

The inclusion of separate teeth 108 enables attachment 100 to be used for digging rocks and other materials from dense or compacted ground or piles. In addition, when attachment 100 is used for rock digging, any loose dirt which may be removed together with rocks will be dropped between each of the individual teeth 108. Spacers 132 also ensure an opening between debris catcher 140 and bucket 200, similarly allowing dirt and other small debris to be dropped when bucket 200 is tilted down towards an emptying position. When the irregular surface of the earth is to be scraped, such as shown in FIG. 6, occasional high spots of soil may be encountered. Teeth 108 will easily penetrate these elevated spots, and, as aforementioned, any loosened dirt will be dropped back to the surface of the earth between each of the teeth 108. In addition, when desirable, bucket 200 may also be designed with slots formed therein, to similarly drop loosened dirt and other small debris.

Figure 7:
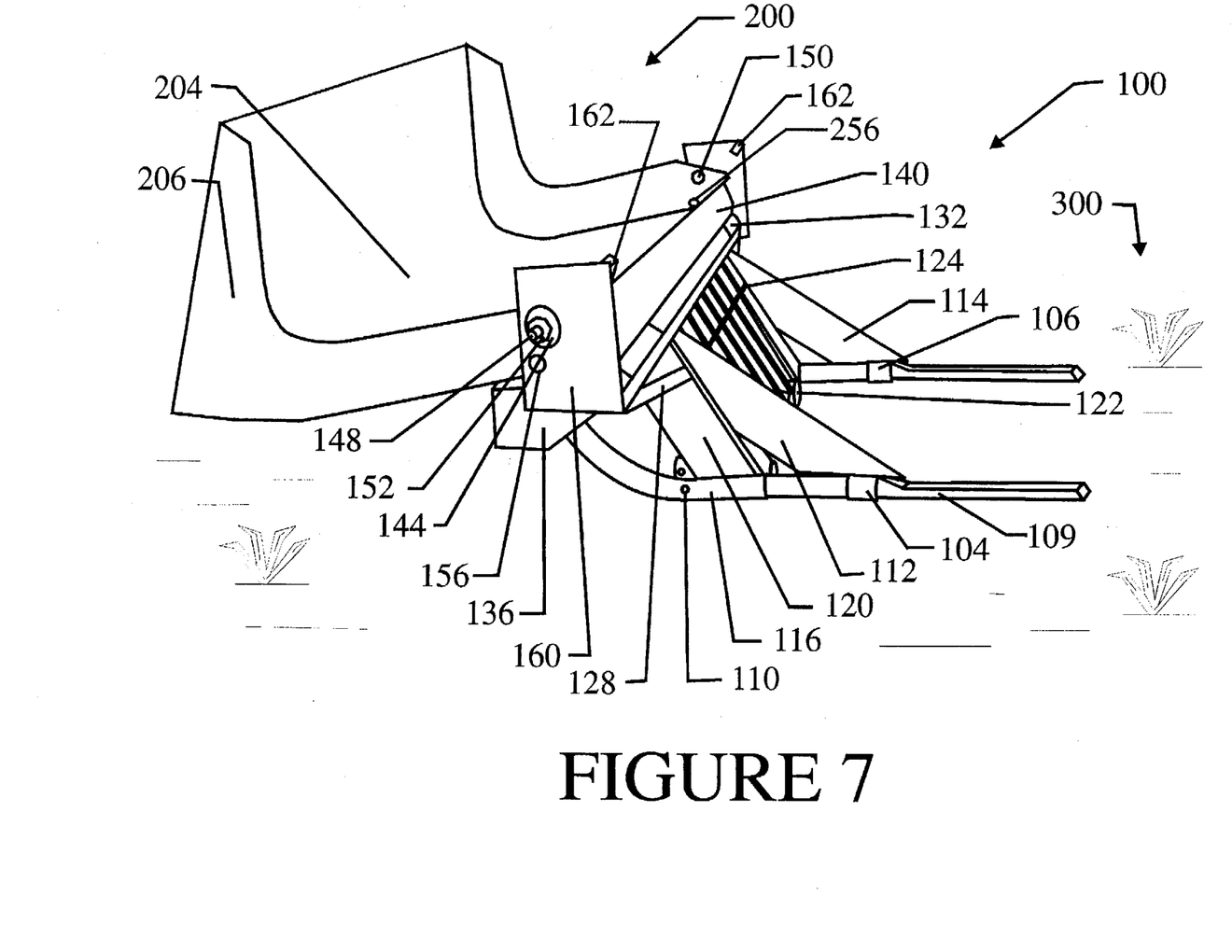
FIG. 7 illustrates an alternative embodiment of the invention, where the attachment is configured for pallet or log handling.

FIG. 7 illustrates an alternative embodiment of the invention, in which each tooth 108 has been removed, and two alternative teeth 109 have been reinserted into right and left knees 116 and 118. With proper spacing of knees 116 and 118, or selective use of any of the other tooth holders 122, attachment 100 may be adapted easily for use with pallets. These same flat teeth 109 may also be used for larger material such as logs, trees and brush which would otherwise be difficult or impossible to pick up with bucket 200. In addition, bucket 200 is illustrated with lower side walls 206. Side walls 206 more easily accommodate logs and other materials wider than bucket 200.

In view of the ready adaptability of the present invention, a very wide variety of materials may be handled effectively without major set up time or the purchase and storage of additional expensive equipment. While rocks, manure, logs, trash, bales and other similar materials have been mentioned, the invention will also be readily used for the breaking up and removal of diverse materials such as asphalt roadways and driveways. The application of the attachment 100 to specific materials will be obvious to those of ordinary skill after a review of the accompanying disclosure.

While the foregoing details what is felt to be the preferred embodiment of the invention, no material limitations to the scope of the claimed invention are intended. Further, features and design alternatives that would be obvious to one of ordinary skill in the art are considered to be incorporated herein. In fact, a number of such alternatives have already been enumerated. However, a full and complete listing of all possible alternatives would not be practical within the content of these pages. Rather, the scope of the invention is set forth and particularly described in the claims hereinbelow.

I claim:

1. A material loader attachment movably mounted to a loader bucket for loading material from a surface or within a conglomeration, comprising:
   a support bar adjacent said loader bucket and movably attached thereto;
   a leading edge distal to said loader bucket;
   a material support between said leading edge and said support bar supporting said material during loading;
   a pivot between said bucket and said material support about which said material support is raised and tilted by lowering said bucket, whereby lowering said bucket relative to said surface or said conglomeration raises said material support from supporting said material to unloading said material into said bucket.

2. The material loader attachment of claim 1 further comprising a debris catcher for retaining debris in said bucket during material loading, said debris catcher coupled to said support bar and moved during movement of said support bar between a retaining position and an unloading position.

3. The material loader attachment of claim 2 further comprising a plurality of teeth, said teeth forming said leading edge, and a plurality of tooth supports extending from said support bar to said plurality of teeth, said tooth supports forming said material support, whereby small particles of said material may pass through said leading edge and said material support.

4. The material loader attachment of claim 1 wherein said support bar is pivotally attached to said loader bucket.

5. The material loader attachment of claim 2 wherein said support bar is pivotally attached to said loader bucket.

6. The material loader attachment of claim 5 wherein said debris catcher is attached to said support bar by a fixed spacer and pivots therewith.

7. The material loader attachment of claim 3 wherein said plurality of teeth are removable from said plurality of tooth supports.

8. The material loader attachment of claim 7 wherein said plurality of teeth comprises more than one of a generally cylindrical tooth.

9. The material loader attachment of claim 8 wherein said generally cylindrical tooth proximal to said leading edge is generally flat, and distal to said leading edge is generally cylindrical, and said plurality of teeth comprises two of said generally cylindrical tooth.

10. An attachment for loading and unloading material in and out of a bucket comprising:
    a means for attaching said attachment to said bucket while still allowing rotation therebetween;
    a means for extracting said material from a surface;
    a means for pivoting said extracting means responsive to movement of said bucket closer to or further from said bucket, said extracting means being pivoted by said bucket from a material extracting position to a bucket loading position by moving said bucket closer to said surface.

11. The attachment of claim 10 wherein said extracting means further comprises a means for sifting said material to release back to said surface finer particles of said material.

12. The attachment of claim 10 further comprising means for blocking said bucket from unloading material thereof, said blocking means and said extracting means rotating through said attaching means relative to said bucket whereby said bucket is either blocked or more readily unloaded, depending upon the relative position between said attachment and said bucket.

13. The attachment of claim 11 wherein said extracting means further comprises means for piercing a surface, said piercing means removable from and replaceable in said extracting means.

14. A rock picker, diverse material loader and excavating attachment for a scoop comprising:
    a laterally extending support bar having a major surface thereof laterally extending;
    a longitudinally extending generally cylindrical tooth;
    a tooth receiver into which said tooth is mounted and from which said tooth may be removed non-destructively, said tooth having a first end received within said tooth receiver and a second end distal thereof;

a longitudinally extending tooth receiver support attached at a first end to said support bar and at a second end to said tooth receiver;

a laterally extending debris catcher having a major surface thereof generally perpendicular to said support;

a means for fastening said attachment to said scoop while still allowing rotation therebetween, said fastening means having an axis of rotation laterally extending;

a means for pivoting said tooth receiver support, said tooth, said support bar and said debris catcher about said axis of rotation relative to said scoop and a surface when said scoop is raised or lowered relative to said surface, said tooth being raised when said scoop is lowered.

15. The attachment of claim 14 wherein said pivoting means comprises an arcuate means for holding said tooth having a first end adjacent said scoop and a second end adjacent said tooth.

16. The attachment of claim 15 wherein said first end of said tooth holding means is further from said first end of said tooth than said fastening means is from said first end of said tooth.

17. The material loader attachment of claim 1 further comprising a means for stopping rotation between said material support and said bucket at a relative position therebetween where said material support will still be counter-rotated by raising said bucket.

18. A material loader attachment movably mounted to a load bucket for loading material from a surface or within a conglomeration, comprising:

a support bar adjacent said loader bucket and movably attached thereto;

a leading edge distal to said loader bucket, said leading edge first engaging said material during picking;

a material support between said leading edge and said support bar where said material is temporarily supported after picking and prior to bucket loading;

a pivot between said bucket and said material support about which said material support is raised and tilted by lowering said bucket relative to said surface or said conglomeration;

a debris catcher for retaining debris in said bucket during material loading, said debris catcher moved, by raising or lowering said bucket relative to said surface or said conglomeration, between a retaining position and an unloading position.

19. The material loader attachment of claim 18 further comprising actuators to raise and tilt said material support.

* * * * *